US005617100A

United States Patent [19]
Akiyoshi et al.

[11] Patent Number: 5,617,100
[45] Date of Patent: Apr. 1, 1997

[54] ACCURATE POSITION MEASURING SYSTEM

[75] Inventors: Masami Akiyoshi, Fukuoka; Yuji Mitsunaga, Dazaifu, both of Japan

[73] Assignee: Matsushita Electric Industrial Co., Ltd., Osaka, Japan

[21] Appl. No.: 414,588

[22] Filed: Mar. 31, 1995

[30] Foreign Application Priority Data

Apr. 7, 1994 [JP] Japan .................................. 6-069488
Apr. 8, 1994 [JP] Japan .................................. 6-071001

[51] Int. Cl.$^6$ ....................................................... G01S 5/02
[52] U.S. Cl. ........................ 342/357; 342/352; 455/12.1; 455/33.1
[58] Field of Search .................................. 342/357, 352; 455/12.1, 13.1, 33.1

[56] References Cited

U.S. PATENT DOCUMENTS

| | | | |
|---|---|---|---|
| 4,506,383 | 3/1985 | McGann | 455/17 |
| 4,751,512 | 6/1988 | Longaker | 342/357 |
| 5,225,842 | 7/1993 | Brown et al. | 342/357 |
| 5,414,432 | 5/1995 | Penny et al. | 342/357 |
| 5,477,458 | 12/1995 | Loomis | 364/445 |

FOREIGN PATENT DOCUMENTS

| | | |
|---|---|---|
| 4-31780 | 2/1992 | Japan . |
| 5-232210 | 9/1993 | Japan . |
| 6-3433 | 1/1994 | Japan . |

*Primary Examiner*—Thomas H. Tarcza
*Assistant Examiner*—Dao L. Phan
*Attorney, Agent, or Firm*—Spencer & Frank

[57] ABSTRACT

An accurate position measuring system includes a communication satellite, a position measuring satellite, a position reference station, a network management station and a position measuring device. The communication satellite performs data communication. The position measuring satellite transmits position measurement data necessary for a position measurement calculation. The position reference station receives the position measurement data from the position measuring satellite and calculates positional error information. The calculated positional error information is transmitted to a network management station. The network management station collects the positional error information transmitted from the position reference station and transmits the collected positional error information to the communication satellite. The position measuring device receives the position measurement data from the position measuring satellite and calculates its current position. The position measuring device further receives the positional error information transmitted from the network management station through the communication satellite and corrects the calculated position information by means of the received positional error information.

27 Claims, 5 Drawing Sheets

ACCURATE POSITION MEASURING SYSTEM

BACKGROUND OF THE INVENTION

The present invention relates to an accurate position measuring system utilizing a bidirectional data communication system which includes an artificial satellite. A conventional accurate position measuring system will now be described with reference to the accompanying drawings.

Figure 9:
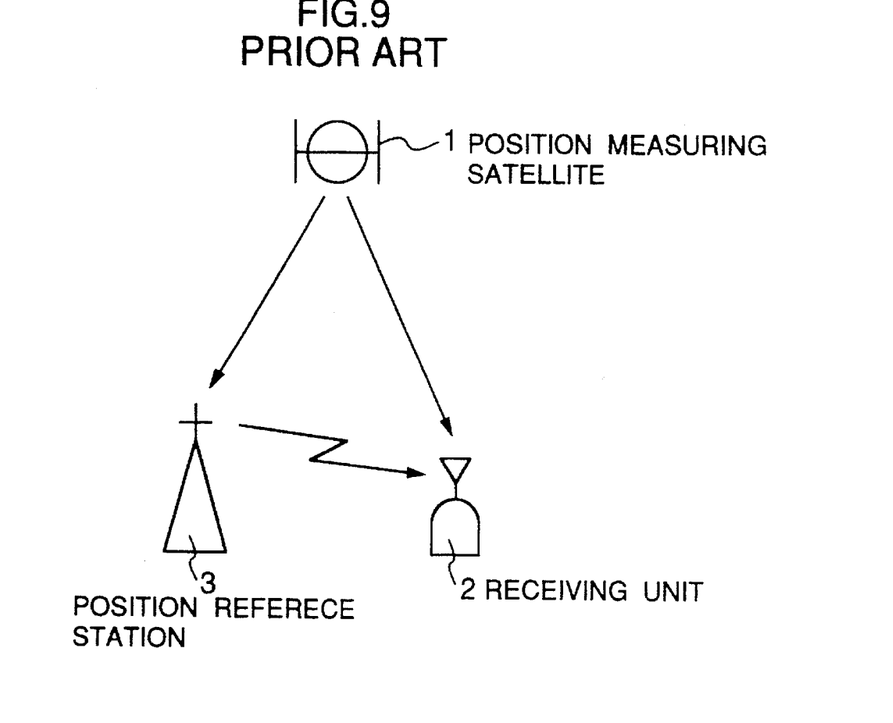
FIG. 9 is a schematic diagram illustrating a conventional accurate position measuring system.

FIG. 9 schematically illustrates a conventional accurate position measuring system. The system includes a position measuring satellite 1, a receiving unit 2 and a position reference station 3. In this conventional system, the receiving unit 2 constitutes a position measuring device.

The position measuring satellite 1 transmits position measurement data necessary for position measurement calculation. The position reference station 3 previously stores its own exact position and calculates a positional error on the basis of the position of the station as calculated from the position measurement data transmitted from the satellite 1 and the previously stored exact position of the station. The position reference station 3 transmits the positional error as positional error information to the receiving unit 2. The receiving unit 2 receives the position measurement data from the satellite 1 and executes a position measurement calculation, with the calculation result being corrected in accordance with the positional error information from the position reference station 3.

Operation of the accurate position measuring system shown in FIG. 9 will now be described.

The position measurement data transmitted from the position measuring satellite 1 is received by the receiving unit 2 and the position reference station 3. The position reference station 3 calculates a positional error on the basis of the position of the station calculated by the received position measurement data and the exact position of the station stored previously, and transmits the positional error as the positional error information in an area where the position reference station 3 is located. In this case, the transmittable range of the positional error information from the position reference station 3 and the transmission frequency of the positional error information are determined, so that the receiving unit 2 positioned in the area can tune the predetermined frequency to receive the positional error information transmitted from the station 3 located in the area.

The receiving unit 2 uses the position measurement data received from the satellite 1 to perform the position measurement calculation so that the receiving unit calculates the position information relative to the current position thereof. Since the positional error of the current position is as relatively large as about 100 meters, the receiving unit 2 receives the position error information from the position reference station 3 and corrects the position information obtained by the position measurement calculation on the basis of the positional error information to thereby calculate the exact position information relative to the current position.

Figure 10:
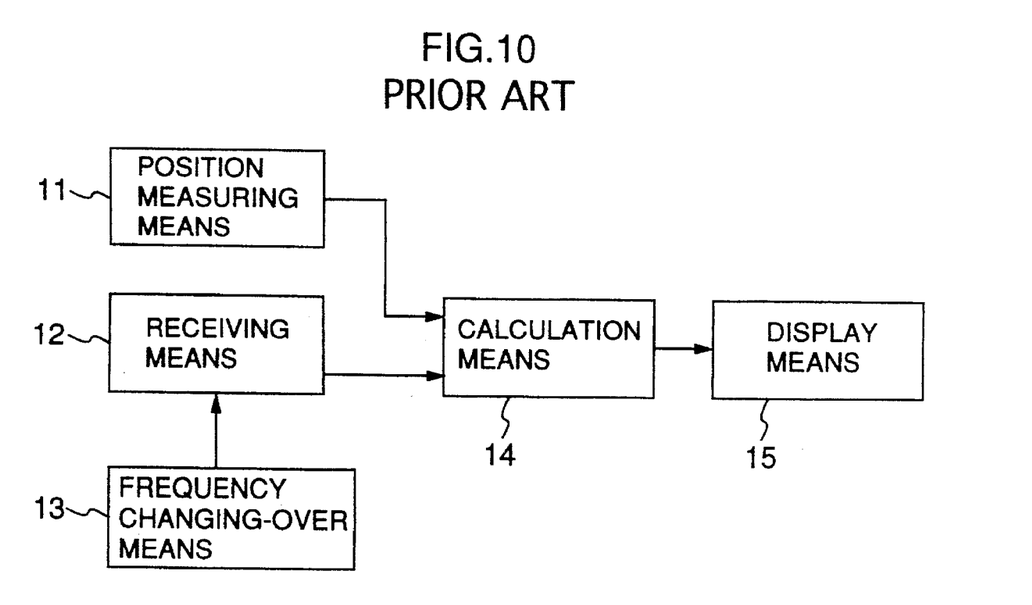
FIG. 10 is a functional block diagram of a receiving unit in the conventional accurate position measuring system.

FIG. 10 is a functional block diagram of the receiving unit in the conventional accurate position measuring system. As shown in FIG. 10, the receiving unit 2 includes position measuring means 11, receiving means 12, frequency changing-over means 13, calculation means 14 and display means 15.

The position measuring means 11 receives the position measurement data from the position measuring satellite 1 and performs the position measurement calculation to calculate the position information relative to the current position. The receiving means 12 receives the positional error information from the position reference station 3. The frequency changing-over means 13 changes over the receiving frequency of the receiving means 12 in order to obtain the pertinent positional error information in accordance with the movement of the receiving unit. The calculation means 14 corrects the position information obtained by the position measuring means 11 on the basis of the positional error information received by the receiving means 12. The display means 15 displays the position information corrected by the calculation means 14.

Operation of the receiving unit 2 configured as discussed above will now be described.

The position measurement data transmitted from the position measuring satellite is received by the position measuring means 11 and the position information relative to the current position of the receiving unit 2 is calculated by the position measuring means 11. On the other hand, in order to obtain the positional error information corresponding to the area where the receiving unit 2 is positioned, a channel of the receiving means 12 is changed over to a frequency band assigned to the area by the frequency changing-over means 13, so that the receiving means 12 obtains the pertinent positional error information corresponding to the area where the receiving unit 2 is located. The positional error information received by the receiving means 12 is used to correct the position information calculated by the position measuring means 11, so that the position information has considerably high accuracy. The position information with high accuracy corrected by the calculation means 14 is displayed in the display means 15.

In the conventional accurate position measuring system described above, however, since the transmission frequency of the positional error information transmitted from the position reference station 3 is varied in accordance with the area where the position reference station 3 is located, it is necessary to change over the reception frequency of the receiving means 12 by the frequency changing-over means 13 each time the area is varied due to the movement of the receiving unit 2.

Further, since a broadcasting system which includes the position reference station 3 is used to transmit the positional error information, there are various problems in the broadcasting system due to the location and location intervals of the position reference stations 3, radio interference and the like.

SUMMARY OF THE INVENTION

It is an object of the present invention to provide an accurate position measuring system capable of eliminating troublesomeness due to changing over the frequency in accordance with the area in order to obtain positional error information, solving various problems in the broadcasting system and grasping a highly accurate position in every area easily.

In order to achieve the above object, the accurate position measuring system of the present invention comprises a communication satellite for performing data communication, a position measuring satellite for transmitting position measurement data necessary for a position measurement calculation, a position reference station for receiving the position measurement data from the position measuring satellite and for calculating a positional error transmitting the positional error as positional error information, a network management station for collecting the positional error information transmitted from the position reference station and transmitting the collected positional error information to the communication satellite, and a position measuring device for receiving the position measurement data from the position measuring satellite and calculating position information relative to a current position, the position measuring device receiving the positional error information transmitted from the network management station through the communication satellite and correcting the calculated position information by means of the received positional error information.

DESCRIPTION OF THE PREFERRED EMBODIMENTS (Embodiment 1)

A first embodiment of the present invention will now be described with reference to the accompanying drawings.

Figure 1:
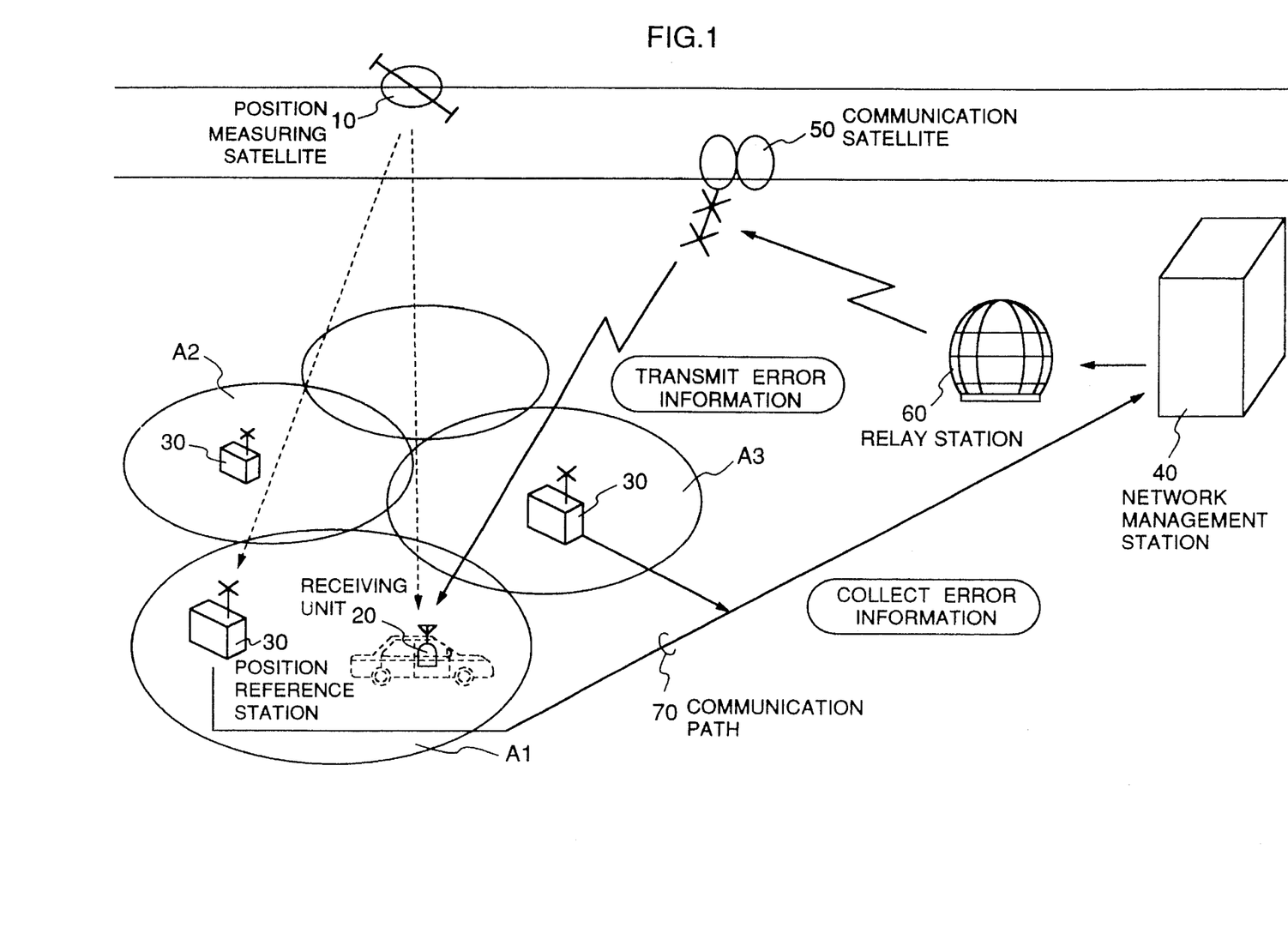
FIG. 1 is a schematic diagram illustrating an accurate position measuring system according to a first embodiment of the present invention.

FIG. 1 is a schematic diagram illustrating an accurate position measuring system according to the first embodiment of the present invention. The accurate position measuring system of FIG. 1 comprises a position measuring satellite 10, an accurate position measurement receiving unit (hereinafter abbreviated as a receiving unit) 20, position reference stations 30, a network management station 40, a communication satellite 50, a relay station 60 and a communication path 70. In FIG. 1, only one position measuring satellite 10 is shown, while there are several position measuring satellites actually. The communication satellite 50 is a stationary satellite, an orbital satellite or the like.

In FIG. 1, the position reference stations 30 are located in areas A1, A2 and A3, respectively, and a circle having a predetermined radius about the position reference station 30 is defined as the range thereof. The receiving unit 20 is mounted in a moving body such as an automobile and in the embodiment the receiving unit 20 constitutes a position measuring device for calculating position information relative to the current position of the moving body.

The position measuring satellite 10 transmits position measurement data necessary for position measurement on the earth to the receiving unit 20 and the position reference stations 30. The position measuring satellite 10 is, for example, a GPS satellite used in the Global Positioning System (GPS).

Each of the position reference stations 30 located in the areas A1, A2 and A3 stores its own exact position previously and receives the position measurement data from the satellite 10 to perform a position measurement calculation. Each of the position reference station 30 calculates a positional error on the basis of its own calculated position and its own exact position stored previously, and transmits the position error as positional error information through the communication path 70 to the network management station 40.

The network management station 40 collects the positional error information transmitted from the position reference stations 30 and adds area information to the collected positional error information (assuming that area information has not already been included in the positional error information by the position reference stations 30) the network management station 40 transmits the positional error information with the added area information to the communication satellite 50. The area information indicates an area (or range) to which the positional error information can be applied. The communication satellite 50 transmits the positional error information with the added area information to every place.

The receiving unit 20 receives the position measurement data from the position measuring satellite 10 and performs a position measurement calculation. Further, the receiving unit 20 receives the positional error information transmitted from the network management station 40 through the communication satellite 50 and corrects the calculated result on the basis of the positional error information to calculate a current position with high accuracy.

Operation of the accurate position measuring system configured as discussed above will now be described.

As shown in FIG. 1, the position measurement data transmitted from the satellite 10 is received by the position reference stations 30 in the areas A1, A2 and A3 and the receiving unit 20 of the moving body. Each of the position reference stations 30 calculates its own position on the basis of the position measurement data and calculates the positional error information on the basis of this calculated position and its own exact position stored previously. The positional error information calculated by the position reference stations 30 is transmitted through the communication path 70 to the network management station 40.

The network management station 40 collects the positional error information transmitted from the position reference station 30 and adds the area information indicative of the applicable area of the positional error information to the positional error information. The positional error information with the added area information is transmitted through the relay station 60 and the communication satellite 50 to every area.

On the other hand, the receiving unit 20 calculates position information relative to its own current position on the basis of the position measurement data received from the position measuring satellite 10 and it also receives the positional error information with the added area information from the communication satellite 50. The receiving unit 20 the area of the position reference station 30 to which its own current position belongs. The receiving unit 20 uses the positional error information of the area to correct the calculated position information and obtains position information with high accuracy. In this case, the area to which the receiving unit 20 belongs is obtained by collating the position information calculated by the position measurement with the area information added to the received positional error information.

As described above, since the positional error information is transmitted by the communication satellite 50, the positional error information can be transmitted in a wide range or region as compared with conventional accurate position measuring system, in which the positional error information is broadcasted by the position reference station 30. Further, since the positional error information from the plurality of position reference stations 30 can be transmitted by the single network management station 40, the number of the broadcasting stations for transmitting the positional error information can be reduced to thereby solve the various problems in the broadcasting system. Accordingly, the user can obtain position information with high accuracy in a wide region.

The configuration and operation of the receiving unit 20, the position reference station 30 and the network management station 40 in the accurate position measuring system will now be described. The following description is made by using the reference numerals used in FIG. 1.

Figure 2:
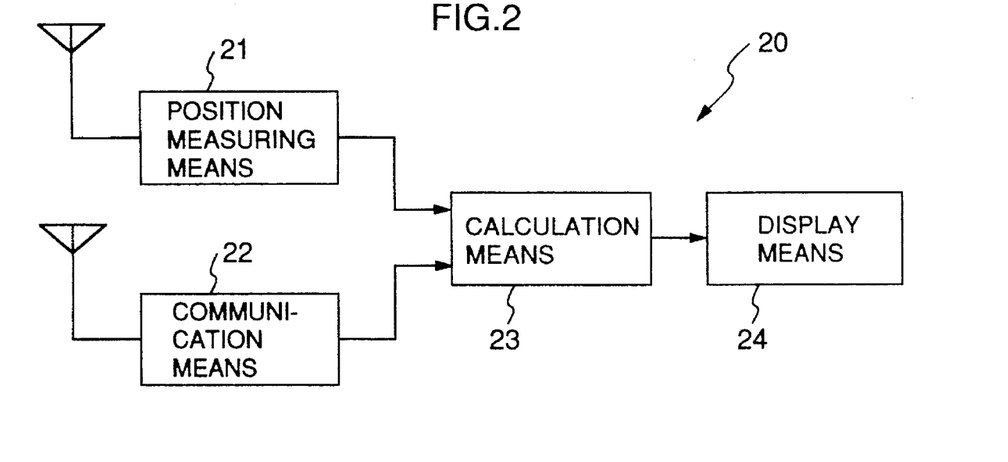
FIG. 2 is a functional block diagram of a receiving unit in the accurate position measuring system according to the first embodiment of the present invention.

FIG. 2 is a functional block diagram schematically illustrating the receiving unit 20 of FIG. 1 in the first embodiment of the present invention. As shown in FIG. 2, the receiving unit 20 includes position measuring means 21, communication means 22, calculation means 23 and display means 24.

The position measuring means 21 receives the position measurement data from the plurality of position measuring satellites 10 and calculates position information relative to the current position of the receiving unit 20 on the basis of the received position measurement data. Further, the position measuring means 21 obtains the area of the position reference station 30 to which the receiving unit 20 belongs. The communication means 22 receives data from the communication satellite 50. The calculation means 23 corrects the position information calculated by the position measuring means 21 by using the positional error information received by the communication means 22. The display means 24 displays the position information corrected by the calculation means 23. Further, the area of the position reference station 30 to which the receiving unit 20 belongs is obtained by collating the position information calculated in the position measuring means 21 with the area information added to the positional error information received by the communication means 22.

Operation of the receiving unit 20 configured as discussed above will now be described.

As shown in FIG. 2, the position measuring means 21 receives the position measurement data transmitted by the plurality of position measurement satellites 10 and performs a position measurement calculation to calculate the current position of the receiving unit 20. On the other hand, the communication means 22 receives the positional error information transmitted from the communication satellite 50. The position measuring means 21 collates the calculated position information with the area information added to the positional error information obtained by the communication means 22 to thereby judge which area of (that is, the area of which position reference station 30) the receiving unit 20 belongs to now.

The calculation means 23 corrects the position information calculated by the position measuring means 21 by using the positional error information corresponding to the position information. Consequently, highly accurate position information is obtained and the corrected position information is displayed by the display means 24.

In this manner, since the receiving unit 20 utilizes the communication satellite 50 to obtain the positional error information, it is not necessary for the communication means 22 to change over the receiving frequency for each area and the receiving unit can obtain the positional error information in every place on the earth, so that the configuration of the receiving unit 20 is simplified.

Figure 3:
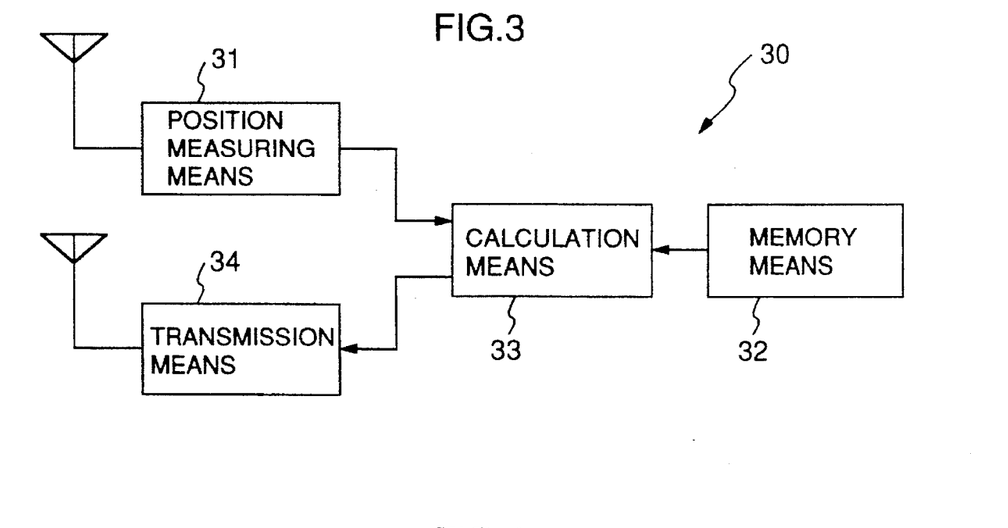
FIG. 3 is a functional block diagram of a position reference station in the accurate position measuring system according to the first embodiment of the present invention.

FIG. 3 is a functional block diagram schematically illustrating the position reference station 30 of FIG. 1 in the first embodiment of the present invention. As shown in FIG. 3, the position reference station 30 includes position measuring means 31, memory means 32, calculation means 33 and transmission means 34.

The position measuring means 31 receives the position measurement data from the plurality of position measuring satellites 10 and performs the position measurement calculation. The exact station position of the position reference station 30 is previously stored in the memory means 32. The calculation means 33 calculates the positional error information of the area where the position reference station 30 is located on the basis of the station position of the position reference station 30 calculated by the position measuring means 31 and the exact station position of the position reference station 30 stored in the memory means 32. The transmission means 34 transmits the positional error information calculated by the calculation means 33.

Operation of the position reference station 30 configured as discussed above will now be described.

As shown in FIG. 3, the position measuring means 31 receives the position measurement data transmitted from the plurality of position measuring satellites 10 and calculates its own position on the basis of the received position measurement data. In this connection, the own position calculated during the position measurement calculation will be called a theoretical value and the exact own position stored in the memory means 32 will be called an actually measured value. The calculation means 33 calculates a positional error on the basis of the theoretical value calculated by the position measuring means 31 and the actually measured value stored in the memory means 32. The calculated positional error is transmitted as the positional error information from the transmission means 34 through the communication path 70 to the network management station 40.

As described above, the positional error information transmitted to the network management station 40 can be transmitted through the communication satellite 50 to every place on the earth.

Figure 4:
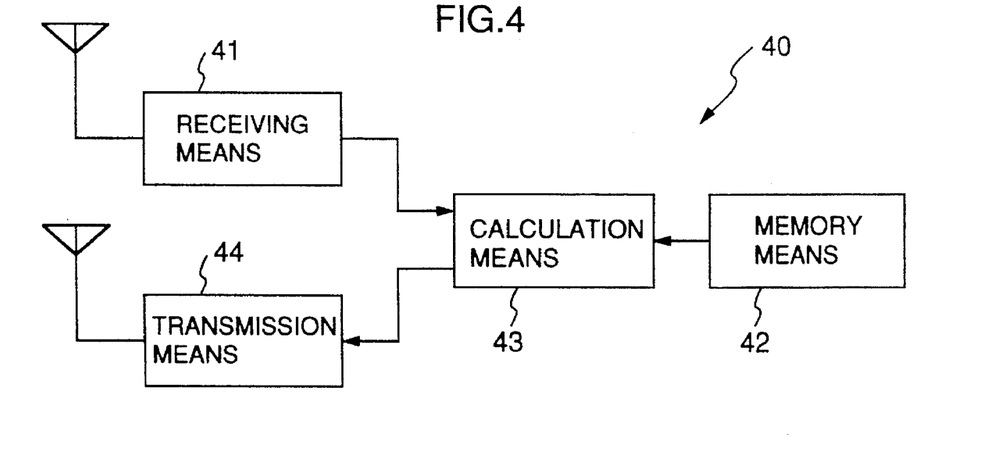
FIG. 4 is a functional block diagram of a network management station in the accurate position measuring system according to the first embodiment of the present invention.

FIG. 4 is a functional block diagram schematically illustrating the network management station 40 of FIG. 1 in the first embodiment of the present invention. As shown in FIG. 4, the network management station 40 includes receiving means 41, memory means 42, calculation means 43 and transmission means 44.

The receiving means 41 receives the positional error information transmitted from the position reference stations 30. The memory means 42 stores the positional error information transmitted from each of the position reference stations 30 if necessary and also stores the area information indicative of the respective applicable ranges of the position reference stations 30. The calculation means 43 collects the positional error information from the position reference stations 30 received by the receiving means 41 and adds the corresponding area information to the position error information. The transmission means 44 transmits the positional error information, to which the area information is added by the calculation means 43, to the communication satellite 50.

Operation of the network management station 40 configured as discussed above will now be described.

As shown in FIG. 4, the positional error information transmitted from the position reference stations 30 through the communication path 70 is received by the receiving means 41. The calculation means 43 collects the positional error information received by the receiving means 41 and reads out the area information stored in the memory means 42 to add the area information to the positional error information. The positional error information to which the area information is added by the calculation means 43 is transmitted to the communication satellite 50 by means of the transmission means 44 so that the positional error information is transmitted to every area by the communication satellite 50.

As described above, by transmitting the positional error information from the network management station 40 through the communication satellite 50, the number of the broadcasting stations for transmitting the positional error information can be reduced.

As described above, the embodiment provides an accurate position measuring system which utilizes the satellite data communication system and which is capable of being employed in a wide region to measure position with high accuracy.

(Embodiment 2)

A second embodiment of the present invention will now be described with reference to the drawings.

Figure 5:
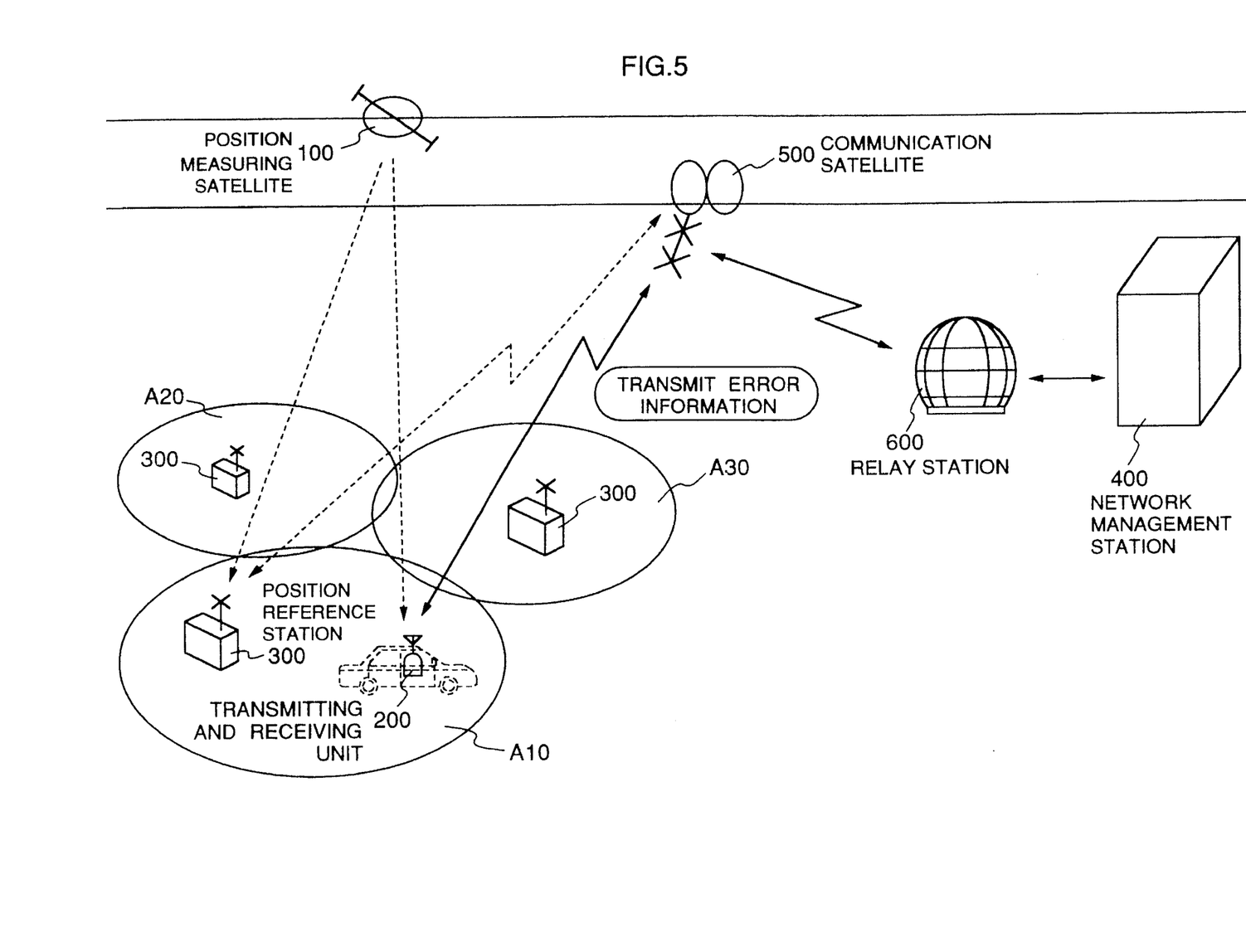
FIG. 5 is a schematic diagram illustrating an accurate position measuring system according to a second embodiment of the present invention.

FIG. 5 is a schematic diagram illustrating an accurate position measuring system according to the second embodiment of the present invention. The accurate position measuring system of FIG. 5 comprises a position measuring satellite 100, an accurate position measurement transmitting and receiving unit (hereinafter abbreviated as a transmitting and receiving unit) 200, position reference stations 300, a network management station 400, a communication satellite 500 and a relay station 600. In FIG. 5, only one position measuring satellite 100 is shown, while there are several position measuring satellites actually. The communication satellite 500 is a stationary satellite, an orbital satellite or the like.

In FIG. 5, the position reference stations 300 are located in areas A10, A20 and A30, respectively. The transmitting and receiving unit 200 is mounted in a moving body such as an automobile and constitutes a position measuring device for calculating the current position. Further, the transmitting and receiving unit 200 be part of a navigation device which displays the current position on a map.

The position measuring satellite 100 transmits position measurement data necessary for position measurement on the earth to the transmitting and receiving unit 200 and the position reference stations 300.

Each of the position reference stations 300 located in the areas A10, A20 and A30 stores its own exact position previously. Each of the position reference stations 300 also receives the position measurement data from the position measuring satellite 100 and performs a position measurement calculation. Thus, the position reference station 300 calculates a positional error on the basis of its own position obtained by the calculation and its own exact position stored previously and transmits the positional error as positional error information to the communication satellite 500.

The network management station 400 collects the positional error information transmitted from each of the position reference stations 300 through the communication satellite 500. The network management station 400 adds area information to the collected positional error information to transmit the positional error information with the added area information to the communication satellite 500. The area information indicates an area (or range) in which the position error information can be applied.

The transmitting and receiving unit 200 receives the position measurement data from the position measuring satellite 100 and calculates the current position. Further, the unit 200 receives the positional error information with the added area information from the network management station 400 through the communication satellite 500. The calculated position information is corrected in accordance with the positional error information. The transmitting and receiving unit 200 transmits the position information corrected by the positional error information to the network management station 400 through the communication satellite 500.

Operation of the accurate position measuring system configured as discussed above will now be described.

As shown in FIG. 5, the position measurement data transmitted by the position measuring satellite 100 is received by the position reference stations 300 in the areas A10, A20 and A30 and the transmitting and receiving unit 200. Each of the position reference stations 300 calculates the positional error on the basis of its own position calculated on the basis of the received position measurement data and its own exact position stored previously. The calculated positional error is transmitted as the positional error information through the communication satellite 500 and the relay station 600 to the network management station 400.

The network management station 400 collects the positional error information transmitted from the position reference stations 300 through the communication satellite 500 and the relay station 600, and adds the area information indicative of the applicable range of the positional error information to the collected positional error information. The positional error information with the added area information is transmitted to every place through the relay station 600 and the communication satellite 500.

On the other hand, the transmitting and receiving unit 200 calculates position information relative to its own current position on the basis of the position measurement data received from the satellite 100, and also receives the positional error information transmitted from the network management station 400 through the communication satellite 500. The transmitting and receiving unit 200 collates the calculated position information with the area information added to the received positional error information to thereby judge the area to which the unit 200 itself belongs. The transmitting and receiving unit 200 corrects the calculated position information by means of the positional error information corresponding to the judged area to obtain highly accurate position information relative to the current position.

In the embodiment, the high accurate current position information obtained by the transmitting and receiving unit 200 is transmitted through the communication satellite 500 and the relay station 600 to the network management station 400. Thus, the network management station 400 can grasp the position information of the transmitting and receiving stations 200 and can manage the moving bodies mounting the transmitting and receiving units 200.

As described above, since the positional error information is transmitted by means of the communication satellite 500, the positional error information can be transmitted in a wide region as compared with the conventional accurate position measuring system, in which the positional error information is broadcasted by the position reference stations 300. Further, since the positional error information from the plurality of position reference stations 300 can be transmitted by the single network management station 400, the number of broadcasting stations for transmitting the positional error information is reduced and accordingly various problems in the broadcasting system are solved. Hence, the user can obtain highly accurate position information in a wide region.

In addition, since the accurate position measuring system of the embodiment can transmit the obtained position information about to the current position of the moving body to the network management station 400, the system can be applied to a taxi operation system, for example. In this case, a transmitting and receiving unit 200 can be mounted in each taxi so that the taxi itself can obtain highly accurate information such as the vehicles position, the distance and time to its destination and the like by the navigation system. On the other hand, the taxi company can obtain the position information transmitted from each taxi through the communication satellite 500 and can use the position information together with a conventional radio system to perform management of the taxi operation management, including monitoring the state of empty cars, the allocation of cars and the like.

The configuration and operation of the transmitting and receiving unit 200, the position reference stations 300 and the network management station 400 in the accurate position measuring system shown in FIG. 5 will now be described in detail. The following description is presented using the reference numerals used in FIG. 5.

Figure 6:
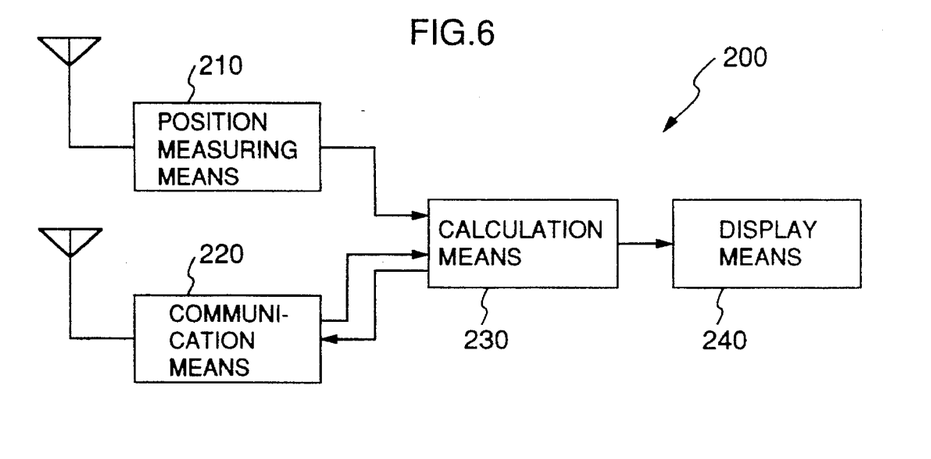
FIG. 6 is a functional block diagram of a transmitting and receiving unit in the accurate position measuring system according to the second embodiment of the present invention.

FIG. 6 is a functional block diagram schematically illustrating the transmitting and receiving unit 200 of FIG. 5 in the second embodiment of the present invention. As shown in FIG. 6, the transmitting and receiving unit 200 comprises position measuring means 210, communication means 220, calculation means 230 and display means 240.

The position measuring means 210 receives the position measurement data from the plurality of position measuring satellites 100 and calculates position information relative to the current position of the transmitting and receiving unit 200 on the basis of the position measurement data. The communication means 220 performs transmitting and receiving of data with respect to the communication satellite 500. The calculation means 230 corrects the position information calculated by the position measuring means 210 by means of the positional error information received by the communication means 220. The display means 240 displays the corrected position information.

Operation of the transmitting and receiving unit 200 configured as discussed above will now be described.

As shown in FIG. 6, the position measuring means 210 receives the position measurement data transmitted from the plurality of position measuring satellites 100 and performs the position measurement calculation to thereby calculate the position information relative to the current position of the transmitting and receiving unit 200. On the other hand, the communication means 220 receives the positional error information transmitted from the network management station 400 through the communication satellite 500.

The calculation means 230 collates the position information calculated by the position measuring means 210 with the area information added to the received position error information to thereby judge the pertinent positional error information and corrects the position information calculated by the position measuring means 210 by means of the pertinent positional error information. Consequently, highly accurate position information is obtained. The obtained position information is displayed in the display means 240. Further, the position information can be transmitted by the communication means 220 to the network management station 400 through the communication satellite 500.

As described above, since the transmitting and receiving unit 200 of the embodiment utilizes the communication satellite 500 to obtain the positional error information, it is not necessary to change over the receive frequency of the communication means 220 in accordance with the area and the positional error information can be obtained every place on the earth. The configuration of the transmitting and receiving unit 200 is simplified. In addition, the user can obtain the user's own position with high accuracy by means of the transmitting and receiving unit 200 and can inform others of the user's own position.

Further, the transmitting and receiving unit 200 constitutes the position measuring device of the present invention, and it is needless to say that the unit 200 may constitute a part of a navigation apparatus. The navigation apparatus comprises, in addition to the transmitting and receiving unit 200 shown in FIG. 6, memory means (not shown) constituted by a CD-ROM or the like for storing map data and control means (not shown) for reading out the map data in the region including the position information corrected on the basis of the positional error information by the calculation means 230. The read out map data and the corrected position information are displayed in combination by the display means 240.

Further, since the transmitting and receiving unit 200 includes the communication means 220, the map data may be stored in the network management station 400. When the network management station 400 receives the position information relative to the current position transmitted from the transmitting and receiving unit 200, the network management station 400 may transmit the pertinent map data to the transmitting and receiving unit 200 through the communication satellite 500.

Figure 7:
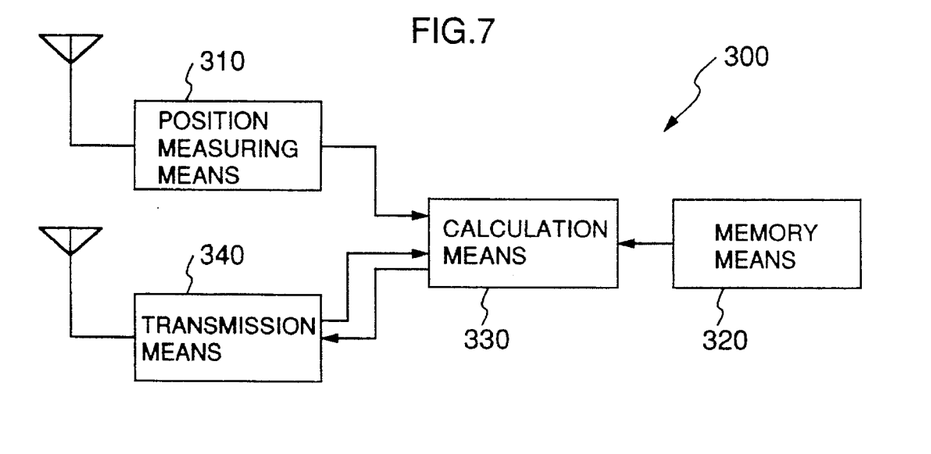
FIG. 7 is a functional block diagram of a position reference station in the accurate position measuring system according to the second embodiment of the present invention.

FIG. 7 is a functional block diagram schematically illustrating the position reference station 300 of FIG. 5 in the second embodiment of the present invention. As shown in FIG. 7, the position reference station 300 includes position measuring means 310, memory means 320, calculation means 330 and communication means 340.

The position measuring means 310 receives the position measurement data from the plurality of position measuring satellites 100 to perform the position measurement calculation. The memory means 320 stores the exact position of the position reference station 300 itself. The calculation means 330 calculates the position error on the basis of the position of the station calculated by the position measuring means 310 and the exact position of the station stored in the memory means 320. The communication means 340 transmits the position error calculated in the calculation means 330 as the positional error information to the communication satellite 500.

Operation of the position reference station 300 configured as discussed above will now be described.

As shown in FIG. 7, the position measuring means 310 receives the position measurement data transmitted from the plurality of position measuring satellites 100 and calculates the position of the station 300 on the basis of the received position measurement data. In this connection, the calculated station position calculation will be called the theoretical value and the exact station position stored in the memory means 320 will be called the actually measured value. A difference between the theoretical value and the actually measured value is the positional error. The calculation means 330 calculates the positional error on the basis of the theoretical value calculated by the position measuring means 310 and the actually measured value stored in the memory means 320. The calculated positional error is transmitted as the positional error information by means of the communication means 340 to the communication satellite 500.

In the embodiment, the position reference station 300 includes the communication means 340 and transmits the positional error information by means of the communication means 340 through the communication satellite 500 to thereby spread the transmission range of the positional error information to the network management station 400.

In a vast place such as a desert or a high mountain, for example, it is very difficult to transmit the positional error information by using a conventional ground communication path such as cable or telephone lines, while the communication satellite 500 can be used to easily transmit the positional error information even in such a place.

Figure 8:
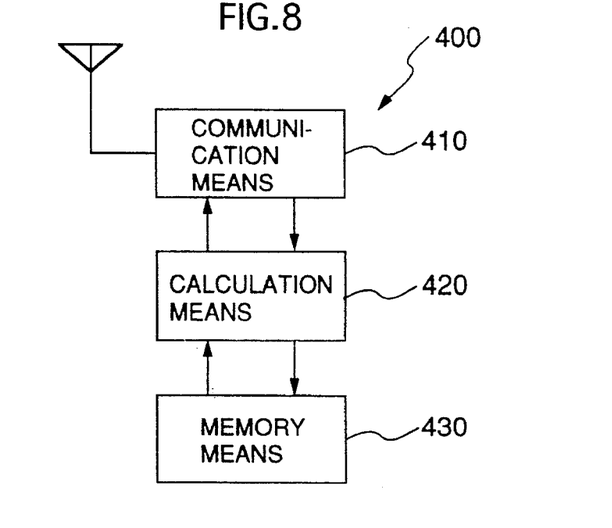
FIG. 8 is a functional block diagram of a network management station in the accurate position measuring system according to the second embodiment of the present invention.

FIG. 8 is a functional block diagram schematically illustrating the network management station 400 of FIG. 5 in the second embodiment of the present invention. As shown in FIG. 8, the network management station 400 includes communication means 410, calculation means 420 and a memory means 430.

The communication means 410 performs data communication with the communication satellite 500. The calculation means 420 collects the positional error information from the position reference stations 300 received by the communication means 410 and adds area information relative to the area corresponding to each of the position reference stations 300 to the positional error information. The memory means 430 stores the area information and also stores the positional error information from each of the position reference stations 300 and the position information from each of the transmitting and receiving units 200 if necessary.

Operation of the network management station 400 configured as discussed above will now be described.

As shown in FIG. 8, the positional error information transmitted from each of the position reference stations 300 through the communication satellite 500 is received by the communication means 410. The calculation means 420 collects the positional error information received by the communication means 410. The calculation means 420 reads out the area information relative to the area corresponding to each positional error information from the memory means 430 and adds the area information to the positional error information. The positional error information with the added area information is stored in the memory means 430 if necessary. The positional error information to which the area information is added by the calculation means 420 is transmitted to the communication satellite 500 by means of the communication means 410. Thus, the positional error information is transmitted to every place.

Further, the position information transmitted from the transmitting and receiving unit 200 through the communication satellite 500 is received by the communication means 410. The position information from the transmitting and receiving unit 200 received by the communication means 410 is stored in the memory means 430. Thus, the network management station 400 can obtain highly accurate position information about the transmitting and receiving units 200 so that vehicles can be managed collectively.

What is claimed is:

1. An accurate position measuring system comprising:
    a communication satellite for performing data transmissions;
    a position measuring satellite for transmitting position measurement data necessary for position measurement calculations;
    a plurality of position reference stations for receiving the position measurement data from said position measuring satellite to calculate their own station positions, for calculating positional error information on the basis of their own station positioning, and for transmitting the positional error information;
    a network station for collecting the positional error information transmitted from the plurality of position reference stations to prepare wide-area positional error information, and for transmitting the wide-area positional error information to said communication satellite; and
    a position measuring device for receiving the position measurement data from said position measuring satellite to calculate its own position, and for receiving the wide-area positional error information transmitted from said network station through said communication satellite to correct its own calculated position using the wide-area positional error information.

2. An accurate position measuring system according to claim 1, wherein said network station collects the positional error information transmitted from said plurality of position reference stations and adds area information indicative of areas to which the positional error information can be applied to the collected positional error information to prepare the wide-area positional error information to be transmitted to said communication satellite.

3. An accurate position measuring system according to claim 2, wherein said position measuring device collates its own position calculated from the position measurement data received from said position measuring satellite with said area information to take out pertinent positional error information from the wide-area positional error information received from said communication satellite and uses the pertinent positional error information to correct its own position.

4. An accurate position measuring system according to claim 1, wherein each position reference station compares its own station position calculated from the position measurement data with and its own accurate station position stored previously, to calculate the positional error information.

5. An accurate position measuring system according to claim 1, wherein said position reference stations transmits the calculated positional error information to said network management station through said communication satellite.

6. An accurate position measuring system according to claim 1, wherein said position measuring device transmits its position, corrected by using the wide-area positional error information, to said network station through said communication satellite to permit the position of the position measuring device to the managed in said network station.

7. A position measuring device for use in an accurate position measuring system which includes a communication satellite for transmission, a position measuring satellite for transmitting position measurement data necessary for position measurement calculations, a plurality of position reference stations for receiving the position measurement data from said position measuring satellite to calculate their own station positions and for calculating positional error information on the basis of their own station positions and for transmitting the positional error information, and a network station for collecting the positional error information transmitted from the plurality of position reference stations to prepare wide-area positional error information and for transmitting the wide-area positional error information to said communication satellite, and said position measuring device, wherein said position measuring device comprises:

position measuring means for receiving the position measurement data from said position measuring satellite and calculating the position of said position measuring device, receiving means for receiving the wide-area positional error information from said communication satellite, and calculation means for correcting the calculated position of said position measuring device using the wide-area positional error information.

8. A position measuring apparatus according to claim 7, further comprising transmission means for transmitting its own position corrected by said calculating means in accordance with the positional error information, to said communication satellite through said communication network to said network station.

9. A position reference station for use in an accurate position measuring system which includes a communication satellite for performing data communication, a position measuring satellite for transmitting position measurement data necessary for position measurement calculations, said position reference station, at least one further position reference station, a network station for collecting positional error information transmitted from the position reference stations to prepare wide-area positional error information and transmitting the wide-area positioned error information to said communication satellite, and a position measuring device for receiving the position measurement data from said position measuring satellite to calculate its own position and receiving the wide-area positional error information transmitted from said network station through said communication satellite to corrects its own position using the wide-area positional error information, wherein said position reference station comprises:

position measuring means for receiving the position measurement data and calculating its own station position, memory means for storing its own accurate station position previously, calculation means for calculating the positional error information on the basis of its own station position calculated by said position measuring means and its own station position stored in said memory means, and transmission means for transmitting the positional error information calculated by said calculation means to said network station.

10. A position reference station according to claim 9, wherein said transmission mans includes means for transmitting the positional error information calculated by said calculation means to said network station through said communication satellite.

11. A network management station according to claim 9, wherein said receiving means receives the positional error information from said communication satellite.

12. A network management station according to claim 9, wherein said receiving means receives position information from said position measuring device in addition to the positional error information from said position reference station.

13. A network station for use in an accurate position measuring system which includes a communication satellite for performing data transmission, a position measuring satellite for transmitting position measurement data necessary for position measurement calculations, a plurality of position reference stations for receiving the position measurement data from said position measuring satellite to calculate their own station positions and for calculating positional error information on the basis of their own station positions and for transmitting the positional error information, said network station, and a position measuring device for receiving the position measurement data from said position measuring satellite to calculate its own position and for receiving wide-area positional error information transmitted through said communication satellite to correct its own position by using the wide-area positional error information, wherein said network station comprises:

receiving means for receiving the positional error information transmitted by the plurality of position reference stations, memory means for storing area information corresponding to the positional error information received by said receiving means, calculation means for adding the area information stored in said memory means to each positional error information to prepare the wide-area positional error information, and transmission means for transmitting the wide-area positional error information prepared by said calculation means to said communication satellite.

14. A navigation apparatus for use in an accurate position measuring system which includes a communication satellite for performing data transmission, a position measuring satellite for transmitting position measurement data necessary for position measurement calculations, a plurality of position reference stations for receiving the position measurement data from said position measuring satellite to calculate their own station positions and for calculating positional error information on the basis of their own station positions and for transmitting the positional error information, a network station for collecting the positional error information transmitted from the plurality of position reference stations to prepare wide-area positional error information and for transmitting the wide-area positional error information to said communication satellite, and said navigation apparatus, wherein said navigation apparatus comprises:

position measuring means for receiving the position measurement data to calculate the position of said navigation apparatus, receiving means for receiving the wide-area positional error information from said communication satellite, calculation means for using the wide-area positional error information to correct the calculated position of said navigation apparatus, memory means for storing map data, display means for displaying the map data, and control means for reading out pertinent map data for the corrected position determined by said calculation means from said memory means to display the map data onto said display unit.

15. An accurate position measuring system according to claim 1, wherein the positional error information transmitted from each of said position reference stations includes area information indicative of an area to which said positional error information of the respective position reference station can be applied.

16. An accurate position measuring system according to claim 15, wherein said position measuring device collates its own position calculated from the position measurement data received from said position measuring satellite with said area information to take out pertinent positional error information from the wide-area positional error information received from said communication satellite and uses the pertinent positional error information to correct its own position.

17. An accurate position measuring system according to claim 1, wherein said network station includes a management station for collecting the positional error information transmitted from the plurality of position reference station to prepare the wide-area positional error information and a relay station for transmitting the wide-area positional error information prepared by said management station to said communication satellite.

18. A navigation apparatus for use in an accurate position measuring system which includes a communication satellite for performing data transmission, a position measuring satellite for transmitting position measurement data necessary for position measurement calculations, a plurality of position reference stations for receiving the position measurement data from said position measuring satellite to calculate their own station positions and for calculating positional error information including area information indicative of application areas on the basis of their own positions and for transmitting the calculated positional error information, said network station, and a position measuring device for receiving the position measurement data from said position measuring satellite to calculate its own position and for receiving the wide-area positional error information transmitted through said communication satellite to correct its own position by using the wide-area positional error information, wherein said network station comprises:

receiving means for receiving the positional error information from the plurality of position reference stations, calculation means for collecting the positional error information to prepare the wide-area positional error information, and transmission means for transmitting the wide-area positional error information prepared by said calculation means to said communication satellite.

19. A network station according to claim 18, wherein said receiving means receives the positional error information from said communication satellite.

20. A network station according to claim 18, wherein said receiving means receives position information from said position measuring device in addition to the positional error information from said position reference station.

21. An accurate position measuring system for use with position measuring satellites which transmits position measurement data necessary for position measurement calculations, comprising:

means for receiving position measurement data at a first location that is known, the first locating lying in a first area;

means for calculating a first calculated position from the position measurement data received at the first location and for determining a first positional error between the first calculated position and the first location;

means for adding area information to the first positional error, the area information that is added to the first positional error identifying the first area;

means for receiving position measurement data at a second location that is known, the second location lying in a second area;

means for calculating a second calculated position from the position measurement data received at the second location and for determining a second positional error between the second calculated position and the second location;

means for adding area information to the second positional error, the area information that is added to the second positional error identifying the second area;

means for combining the first and second positional errors with added area information to provide combined correction information; and means for transmitting the combined correction information into the first and second areas.

22. An accurate position measuring system according to claim 21, wherein the means for transmitting the combined correction information into the first and second areas comprises a communication satellite.

23. An accurate position measuring system according to claim 21, wherein the means for receiving position measurement data at a first location and the means for calculating a first calculated position are disposed at a first reference station at the first location, wherein the means for receiving position measurement data at a second location and the means for calculating a second calculated position are disposed at a second reference station at the second location, wherein the means for adding area information and the means for combining are disposed at a network station, and further comprising means for establishing a communicating path between the first and second reference stations and the network station.

24. An accurate position measuring system according to claim 23, wherein the means for transmitting the combined correction information comprises a communication satellite.

25. An accurate position measuring system according to claim 23, wherein the means for transmitting the combined correction information and the means for establishing a communication path both comprises a communication satellite.

26. An accurate position measuring system according to claim 23, further comprising a plurality of mobile position measuring devices, each of the position measuring devices including means for receiving the position measurement data, means for receiving the combined correction information, and means for calculating the position of the respective position measuring device using the position measurement data and a subset of the combined correction data.

27. An accurate position measuring system according to claim 21, further comprising a plurality of mobile position measuring devices, each of the position measuring devices including means for receiving the position measurement data, means for receiving the combined correction information, and means for calculating the position of the respective position measuring device using the position measurement data and a subset of the combined correction data.

* * * * *